US008525487B1

(12) United States Patent
Stevenson

(10) Patent No.: US 8,525,487 B1
(45) Date of Patent: Sep. 3, 2013

(54) CIRCUIT AND METHOD FOR REGULATING DISCHARGE OF A CAPACITOR

(75) Inventor: Paul E. Stevenson, Colorado Springs, CO (US)

(73) Assignee: Marvell International Ltd., Hamilton (BM)

( * ) Notice: Subject to any disclaimer, the term of this patent is extended or adjusted under 35 U.S.C. 154(b) by 494 days.

(21) Appl. No.: 12/393,639

(22) Filed: Feb. 26, 2009

Related U.S. Application Data

(60) Provisional application No. 61/033,911, filed on Mar. 5, 2008.

(51) Int. Cl.
*H02J 7/00* (2006.01)
(52) U.S. Cl.
USPC .......................................... 320/166; 307/109
(58) Field of Classification Search
USPC ................... 307/109, 110; 320/166; 363/59, 363/60
See application file for complete search history.

(56) References Cited

U.S. PATENT DOCUMENTS

| 4,056,764 | A  | * | 11/1977 | Endo et al. ..................... 320/101 |
| 5,095,223 | A  | * | 3/1992  | Thomas ......................... 307/110 |
| 6,531,792 | B2 | * | 3/2003  | Oshio ............................ 307/109 |
| 6,750,589 | B2 | * | 6/2004  | Cabuz ............................ 310/309 |
| 6,972,973 | B2 | * | 12/2005 | Abe et al. ......................... 363/60 |
| 2005/0174098 | A1 | * | 8/2005  | Watanabe et al. .............. 323/282 |
| 2005/0231173 | A1 | * | 10/2005 | Yano et al. ...................... 320/166 |

* cited by examiner

*Primary Examiner* — Drew A Dunn
*Assistant Examiner* — Robert Grant

(57) ABSTRACT

Embodiments of the present invention include techniques for regulating discharge of a capacitor. In one embodiment, the circuit may be used to store power on a capacitor and regulate the discharge of the capacitor to power a load, such as system electronics, circuitry, or electronic devices. In one embodiment, a first capacitor is charged from a power source and stores energy for powering an electronic device. A second capacitor is coupled to the electronic device for providing power to the electronic device. Switched capacitors are configured to transfer charge from the first capacitor to the second capacitor. A control circuit controls switching of the switched capacitors in response to voltage on the first capacitor. The switching frequency may be increased as the voltage on the first capacitor decreases so that a steady flow of charge is provided across all capacitor voltage levels.

20 Claims, 9 Drawing Sheets

CIRCUIT AND METHOD FOR REGULATING DISCHARGE OF A CAPACITOR

CROSS REFERENCE TO RELATED APPLICATIONS

This application claims the benefit of U.S. Provisional Application No. 61/033,911, filed Mar. 5, 2008, the entire disclosure of which is hereby incorporated herein by reference.

BACKGROUND

The present invention relates to electrical circuits, and in particular, to a circuit and method for regulating discharge of a capacitor.

Capacitors of several Farads to thousands of Farads are being used or are proposed to be used as the primary energy source of a variety of systems—from toys, cell phones, to electric automobiles. The intent is to replace rechargeable batteries with capacitors in the belief that the system will be lighter weight, longer lasting, and offer extremely rapid recharge cycles.

A problem exists in how to regulate energy transfer, such as voltage and current, from an energy storage capacitor to a load. For example, regulating a voltage and current from a capacitor to a load is different than regulating a voltage and current from a battery to a load. Typically, energy from a battery is coupled to a load through a regulator, which may receive a voltage and current from the battery and provide a constant output voltage to the load across a range of load currents. The voltage at the output of the regulator may be higher or lower than the battery voltage, and the load currents may be higher or lower than the current drawn from the battery under the condition that the energy transferred from the battery is greater than the energy provided to the load (the difference is a loss and depends on the efficiency of the regulator). A battery typically outputs a constant voltage and a may provide current according to the battery's rating. The voltage on a battery may drop off at the end of the battery's charge, but otherwise remains relatively stable. However, batteries typically have very long charge cycles and only output voltages at the battery's rated value.

Capacitors, unlike batteries, may be charged quickly and may store a wide range of voltages. The amount of current a capacitor may provide depends on how much charge the capacitor stores. Larger value capacitors store larger amounts of charge, which may be used to provide current to a load. However, also unlike batteries, capacitors may have a significant decrease in voltage as charge is transferred to a load. Accordingly, as charge is provided a load, the voltage on the capacitor may drop significantly. If the load is an electronic device, the voltage may quickly fall below the devices minimum operating level while a significant amount of energy remains on the capacitor.

SUMMARY

Embodiments of the present invention include circuits and methods for regulating discharge of a capacitor. In one embodiment, the present invention includes a circuit comprising a first capacitor coupled to receive voltage and current from a power source, the first capacitor storing energy for powering an electronic device, wherein the first capacitor includes a first voltage, a second capacitor Coupled to the electronic device for providing power to the electronic device, wherein the second capacitor includes a second voltage, a plurality of switched capacitors configured to transfer charge from the first capacitor to the second capacitor, a control circuit to control switching of the plurality of switched capacitors in response to the first voltage, wherein a frequency of the switching increases as the first voltage on the first capacitor decreases.

In one embodiment, the first capacitor is the primary source of power for powering the electronic device.

In one embodiment, the switched capacitors comprise a plurality of capacitors and a plurality of switches, wherein in a first configuration a first portion of the switches are closed to configure the plurality of capacitors in parallel, and wherein in a second configuration a second portion of the switches are closed to configure the plurality of capacitors to in series, wherein the parallel configuration of capacitors are coupled to the first capacitor to receive a charge from the first capacitor, and wherein the series configuration of capacitors are coupled to the second capacitors to deliver the charge to the second capacitor.

In one embodiment, the switched capacitors comprise a first switching capacitor having a first terminal coupled to a reference voltage and a second terminal coupled to the first capacitor through a first switch, one or more additional switching capacitors each having a first terminal coupled to a first terminal of a preceding capacitor through a second switch and a second terminal coupled to the first terminal of the preceding capacitor through a third switch and further coupled to the reference voltage through a fourth switch, wherein a terminal of a last capacitor of the one or more additional capacitors is coupled to the second capacitor through a fifth switch.

In one embodiment, the circuit further comprises a comparator having a first input coupled the second capacitor to receive the second voltage and a second terminal coupled to receive a reference voltage, the comparator activating the control circuit if the second voltage drops below the reference voltage, wherein the plurality of switched capacitors transfer charge from the first capacitor to the second capacitor when the second voltage on the second capacitor is below the reference voltage, and wherein the plurality of switched capacitors do not transfer charge from the first capacitor to the second capacitor when the second voltage on the second capacitor is above the reference voltage.

In one embodiment, the control circuit includes a voltage controlled oscillator having an input coupled to the first capacitor to receive the first voltage and an output to provide an oscillating signal, wherein the switching of the plurality of switched capacitors is responsive to the oscillating signal, and wherein the frequency of the oscillating signal increases as the voltage on the first capacitor decreases.

In one embodiment, the first capacitor is coupled to a charge port through a charging circuit.

In one embodiment, the charging circuit is a resistor.

In one embodiment, the electronic device includes a maximum current, and wherein a maximum frequency of the switching produces a current to a node coupling the second capacitor and the electronic device that is greater than or equal to the maximum current.

In another embodiment, the present invention includes an electronic system comprising electronic circuitry, the electronic circuitry receiving power from at least one terminal, a power supply, the power supply comprising a first capacitor Coupled to receive voltage and current from a power source, the first capacitor storing energy for powering the electronic circuitry when the power source is not connected, wherein the first capacitor includes a first voltage, a second capacitor Coupled to the electronic circuitry for providing power to the electronic circuitry, wherein the second capacitor includes a second voltage, a plurality of switched capacitors configured to transfer charge from the first capacitor to the second capacitor, and a control circuit to control switching of the plurality of switched capacitors in response to the first voltage, wherein a frequency of the switching increases as the first voltage on the first capacitor decreases.

In one embodiment, the switched capacitors comprise a plurality of capacitors and a plurality of switches, wherein in a first configuration a first portion of the switches are closed to configure the plurality of capacitors in parallel, and wherein in a second configuration a second portion of the switches are closed to configure the plurality of capacitors to in series, wherein the parallel configuration of capacitors are coupled to the first capacitor to receive a charge from the first capacitor, and wherein the series configuration of capacitors are coupled to the second capacitors to deliver the charge to the second capacitor.

In one embodiment, the switched capacitors comprise a first switching capacitor having a first terminal coupled to a reference voltage and a second terminal coupled to the first capacitor through a first switch, one or more additional switching capacitors each having a first terminal coupled to a first terminal of a preceding capacitor through a second switch and a second terminal coupled to the first terminal of the preceding capacitor through a third switch and further coupled to the reference voltage through a fourth switch, wherein a terminal of a last capacitor of the one or more additional capacitors is coupled to the second capacitor through a fifth switch.

In one embodiment, the electronic system further comprises a comparator having a first input coupled the second capacitor to receive the second voltage and a second terminal coupled to receive a reference voltage, the comparator activating the control circuit if the second voltage drops below the reference voltage, wherein the plurality of switched capacitors transfer charge from the first capacitor to the second capacitor when the second voltage on the second capacitor is below the reference voltage, and wherein the plurality of switched capacitors do not transfer charge from the first capacitor to the second capacitor when the second voltage on the second capacitor is above the reference voltage.

In one embodiment, the control circuit includes a voltage controlled oscillator having an input coupled to the first capacitor to receive the first voltage and an output to provide an oscillating signal, wherein the switching of the plurality of switched capacitors is responsive to the oscillating signal, and wherein the frequency of the oscillating signal increases as the voltage on the first capacitor decreases.

In one embodiment, the electronic circuitry is a motor.

In one embodiment, the electronic system is an electric vehicle.

In another embodiment, the present invention includes a method of powering an electronic device comprising charging a first capacitor with voltage and current from a power source, the first capacitor storing energy for powering an electronic device, wherein the first capacitor includes a first voltage, during a first phase, configuring a plurality of switched capacitors in parallel with the first capacitor, and in accordance therewith, transferring charge from the first capacitor to the plurality of switched capacitors, during a second phase, configuring the plurality of switched capacitors in series, wherein one of the series configured switched capacitors is coupled to a second capacitor, and in accordance therewith, transferring charge from the series configured switched capacitors to the second capacitor, and coupling voltage and current from the second capacitor to an electronic device, wherein the plurality of switched capacitors are switched between the first and second phases at a first frequency, and wherein the first frequency increases as the first voltage on the first capacitor decreases.

In one embodiment, the first capacitor is the primary source of power for powering the electronic device.

In one embodiment, the method further comprises comparing a second voltage on the second capacitor to a reference voltage, wherein the first and second phases are activated if the second voltage drops below the reference voltage, wherein the plurality of switched capacitors transfer charge from the first capacitor to the second capacitor when the second voltage on the second capacitor is below the reference voltage, and wherein the plurality of switched capacitors do not transfer charge from the first capacitor to the second capacitor when the second voltage on the second capacitor is above the reference voltage.

In one embodiment, the method further comprises sensing the first voltage on the first capacitor and generating an oscillating signal based on the first voltage, wherein the switching of the plurality of switched capacitors is responsive to the oscillating signal, and wherein the frequency of the oscillating signal increases as the voltage on the first capacitor decreases.

The following detailed description and accompanying drawings provide a better understanding of the nature and advantages of the present invention.

DETAILED DESCRIPTION

Described herein are a circuit and method for regulating discharge of a capacitor. In the following description, for purposes of explanation, numerous embodiments and specific details are set forth in order to provide a thorough understanding of the present invention. The present invention as defined by the claims may include some or all of the features in these embodiments alone or in combination with other features described below, and may further include modifications and equivalents of the features and concepts described herein.

Figure 1:
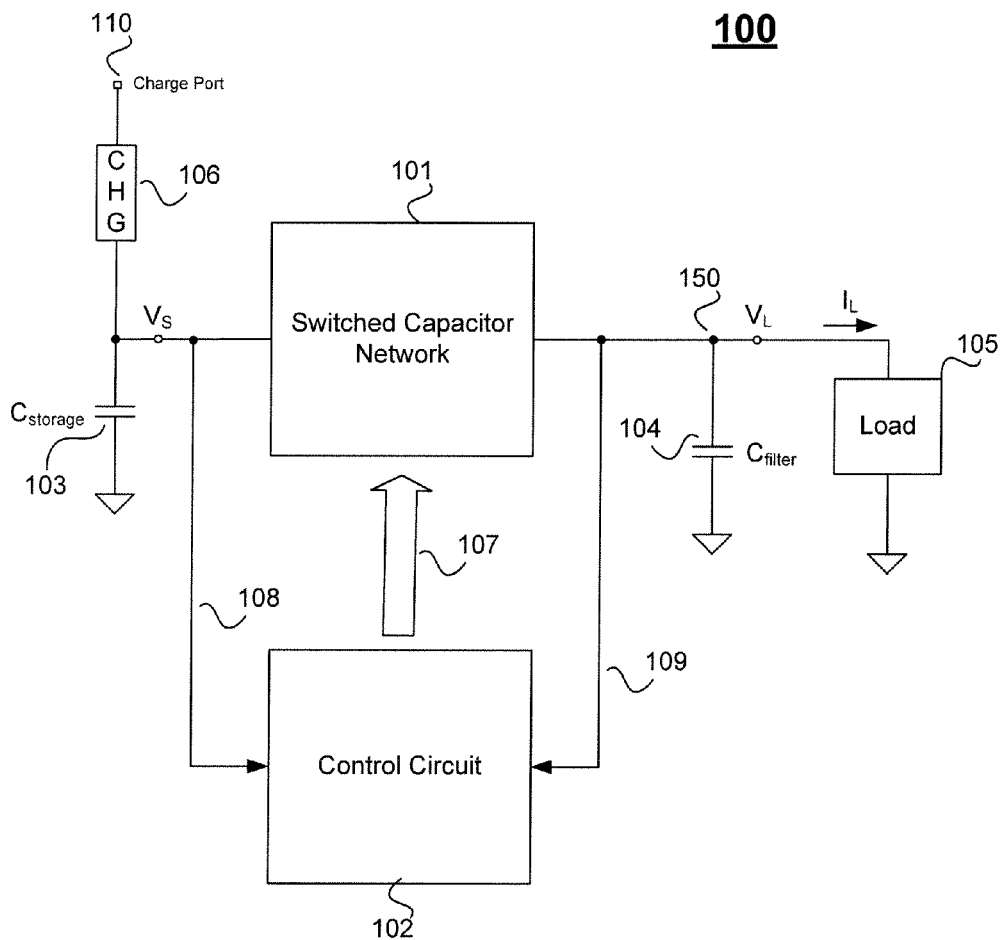
FIG. 1 illustrates a power supply circuit according to one embodiment of the present invention.

FIG. 1 illustrates a circuit 100 according to one embodiment of the present invention. Circuit 100 includes a switched capacitor network 101, control circuit 102, storage capacitor 103, capacitor 104, load 105, and charge circuit 106. Capacitor 103 may function as a source of power in place of a battery, fuel cell, or other charge storage unit, for example. Accordingly, circuit 100 may be used as a power supply for providing power to electronic circuitry in an electronic system, for example. The switched capacitor network 101 includes a plurality of switched capacitors configurable to transfer charge from capacitor 103 to capacitor 104. Circuit 100 may operate as a power supply for an electronic system, where an electronic device is powered using charge transferred from capacitor 103 to provide a supply voltage and supply current to load 105, which may be electronic circuitry of the device or system being powered, for example. Storage capacitor 103 may be the primary source of power or even the only source of power for an electronic device or system, which may include one or more circuit components. Storage capacitor 103 may further be the primary source of power if a battery, external supply, or other power source becomes non-functional, for example.

Initially, circuit 100 may have a power charging source, such as an external power supply, coupled to charge port 110. Voltage and current from the charging source may be received through the charge port 110 and through a charge circuit 106 to charge the storage capacitor 103 with voltage and current. In one embodiment described below, charge port 110 is coupled to capacitor 103 through a resistor, for example, although a variety of different charging circuits could be used. The charging source may charge capacitor 103 to an initial value of voltage $V_S$. The capacitor 103 may be several hundreds of thousands of Farads for some embodiments or may be only a few micro Farads for other embodiments. In one embodiment, the value of capacitor 103 depends on power consumption requirements of load 105 and the time frame in which load 105 is to be powered. As mentioned above, the charging source may be a power supply such as an AC power supply (e.g., a wall plug of a home or industrial facility) or a DC power supply (e.g., a battery or other DC energy source).

Control circuit 102 controls switching of the switched capacitors in switched capacitor network 101. Control circuit 102 may be a state machine implemented using a variety of techniques including, but not limited to, a programmable gate array, an application specific integrated circuit (ASIC), or a programmable controller or processor, for example. The capacitor 103 is coupled to an input of switched capacitor network 101. An input 108 of control circuit 102 is also coupled to capacitor 103 to sense the voltage $V_S$. Control circuit 102 may vary a switching frequency of the switched capacitors in switched capacitor network 101 in response to changes in voltage $V_S$. Switching the capacitor network reconfigures switching capacitors into different configurations to transfer charge from capacitor 103 to capacitor 104. As charge is depleted from capacitor 103, the value of voltage $V_S$ decreases and the frequency of switching the switched capacitors increases so that the charge per unit time (or current) provided from the storage capacitor 103 to the output node 150 remains approximately the same as the voltage on the storage capacitor 103 decreases. For example, the average charge transfer rate of charge may be maintained across different storage capacitor energy levels. For instance, the transfer rate of charge is denoted $$\frac{\Delta Q}{\Delta t}$$

Charge transfer, $\Delta Q$, is related to the voltage on the storage capacitor 103. Accordingly, if the amount of charge transfer is reduced because the voltage $V_S$ on the storage capacitor 103 has decreased, the frequency may be increased (i.e., $\Delta t$ decreased) in order to keep the transfer rate of charge maintained. In some embodiments, circuit 100 may be designed for a rated maximum current of load 105. The rated maximum current of a load may correspond to the maximum current an electronic device may use under worst case conditions (e.g., if a driver of an electric vehicle accelerates sharply or if multiple components (for example, a wireless link, a cellular link, and a microprocessor) of a personal digital assistant (PDA) all operate at the same time). If a power supply provides less than the maximum current, then the voltage at the power supply input of the electronic device may drop and the electronic device may fail to operate properly. Circuit 100 may be configured to supply a current up to a maximum current $I_L$ to load 105, where the maximum current provided by the circuit is greater than or equal to the rated maximum current of the load.

Control circuit 102 senses voltage $V_L$. Control circuit 102 may use voltage $V_L$ to selectively activate the switching of the plurality of switched capacitors in switched capacitor network 101. For example, if $V_L$ drops below a threshold, control circuit 102 may become active and begin switching the plurality of switched capacitors to transfer charge to capacitor 104. Once $V_L$ is above the threshold, which indicates that excess current from the switched capacitor network 101 that is not being used by the load is being used to charge capacitor 104, then control circuit 102 may stop the switching. Accordingly, if the load current $I_L$ is very low (e.g., much less than the rated current), control circuit 102 may charge capacitor 104 to a voltage $V_L$ and then stop switching the switched capacitors for a period of time until $V_L$ has had time to decrease. Under heavier loads (e.g., close to the rated current), control circuit 102 may be turn switching signals 107 on and off in successive phases as described below to transfer charge between capacitor 103 and capacitor 104. Additionally, the frequency of the switching may be incrementally increased as the charge is depleted on capacitor 103 and voltage Vs decreases so that the charge transfer does not reduce at the same rate as the voltage on the capacitor 103. In one embodiment, the increase in switching frequency may be inversely proportional to the decrease in voltage on the capacitor 103 so that the current generated by the switched capacitor network 101 into the output node 150 remains approximately constant.

Figure 2:
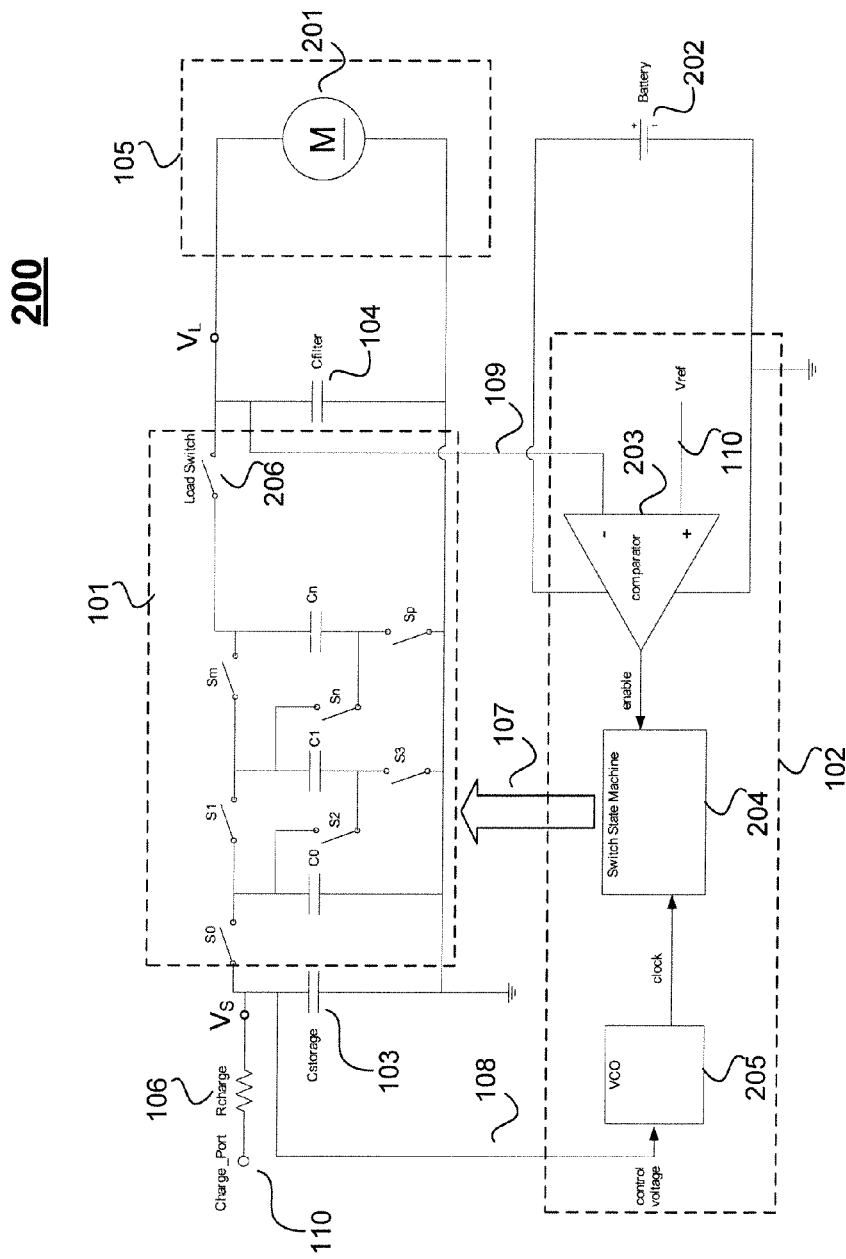
FIG. 2 illustrates a power supply circuit according to another embodiment of the present invention.

FIG. 2 illustrates a power supply circuit 200 according to another embodiment of the present invention. Power supply circuit 200 includes switched capacitor network 101, load 105, control circuit 102, and battery 202. In this embodiment, load 105 is a motor 201, which is just one type of electronic circuitry that may be powered using embodiments of the present invention. Motor 201 may be included in a vehicle, for example. For an electric vehicle, capacitor 103 may be tens of thousands or even hundreds of thousands of Farads, for example.

Switched capacitor network 101 includes capacitors C0, C1, ..., and Cn. In this embodiment, there are only three capacitors, but any number of capacitors may be coupled in a similar manner to provide charge transfer. In this example configuration, switch S0 selectively couples capacitor 103 to a first terminal of capacitor C0, switch S1 selectively couples the first terminal of capacitor C0 to a first terminal of capacitor C1, and switch Sm selectively couples the first terminal of capacitor C1 (i.e., Cn-1) to a first terminal of capacitor Cn. Each capacitor is selectively coupled to storage capacitor 103 for transferring charge to each capacitor. Here, Cn represents the Nth capacitor, where N is the total number of switched capacitors selectively coupled to the storage capacitor 103.

Capacitor C0 has another terminal coupled to a reference voltage such as ground, for example. Switch S2 selectively couples a first terminal of capacitor C0 to a second terminal of capacitor C1, and switch Sn selectively couples a first terminal of capacitor C1 to a second terminal of capacitor Cn. Switch S3 selectively couples the second terminal of capacitor C1 to the reference voltage (e.g., ground) and switch Sp selectively couples the second terminal of capacitor Cn to the reference voltage. Load switch 206 selectively couples the first terminal of capacitor Cn to capacitor 104. In this example, capacitor Cn is the last capacitor in the switched capacitor network, and is coupled to capacitor 104 and load 105 through switch 206.

In operation, switch state machine 204 may control switches S0-S3, Sm-Sp, and load switch 206 to use capacitors C0-Cn to transfer charge from capacitor 103 to capacitor 104 and load 105. The load 105 may draws charge off capacitor 104 to power an electronic circuit. Capacitors C0-Cn and capacitor 104 may be sized such that the switching frequency of power supply circuit 200 may be moderate (e.g., less than 10 MHz), and the ripple on capacitor 104 from the switching does not disturb the load 105. Capacitors 103 and 104 may be much larger than capacitors C0-Cn. Storage capacitor 103 may be several orders of magnitude larger than the switching capacitors C0-Cn. Capacitor 104 may be 100 times the size of capacitor C0-Cn, for example. Capacitors C0-Cn may be approximately the same size, for example. After the switching transfers charge from capacitor 103 to capacitors C0-Cn and transfers charge from capacitors C0-Cn to capacitor 104. The transferring provides power to load 105 from capacitor 103. Generally, a wide range of values may be used for capacitors 103, C0-Cn, and 104 depending on the particular constraints of the application.

In transferring charge from capacitor 103 switches S0, S1, Sm, S3, and Sp are closed and the other switches are opened. Therefore, the switched capacitors are configured in parallel with the storage capacitor 103. Charge is transferred from capacitor 103 to each of the capacitors in the switched capacitor network 101 (i.e., capacitors C0, C1, and Cn). Accordingly, each capacitor is charged to the same voltage as the storage capacitor 103. This is the charging phase of the switching cycle.

In transferring charge to capacitor 104, switch S2, switch Sn, and load switch 206 may be closed and the other switches may be opened. Therefore, the switched capacitors are configured in series. The series connected capacitors are coupled to the output node through the load switch 206. Accordingly, charge is transferred from the switched capacitor network (i.e., capacitors C0, C1, and Cn) to capacitor 104 and load 105. The timing and the selection of switches are controlled by control signals 107 received from control circuit 102. The higher the frequency of switching, the more charge that is transferred from storage capacitor 103 to capacitor 104 and the load. In other words, the higher the frequency of switching, the higher the current that is transferred to the output to support the current requirements of the load.

In this example, control circuit 102 includes comparator 203, switch state machine 204, and voltage controlled oscillator (VCO) 205. VCO 205 senses voltage $V_S$ from connection 108 and generates a periodic signal having a frequency that may be inversely proportional to the voltage $V_S$. The periodic signal may be a clock signal, for example. The clock is coupled to switch state machine 204, which controls the opening and closing of the switches in switched capacitor network 101, where the frequency of the clock corresponds to the frequency at which the state machine configures switched capacitors in parallel with the storage capacitor and then reconfigures the switched capacitors in series to transfer charge to the output. In this example, state machine 204 is enabled by the output of comparator 203, which compares the voltage $V_L$ to a predetermined reference voltage Vref. If the voltage on capacitor 104 rises above a predetermined value as set by the reference voltage in this example, then the state machine is disabled and charge transfer is halted. However, if the current into the load causes the voltage on capacitor 104 to fall below the predetermined value, then the state machine is activated, and the state machine causes the capacitors to charge from the storage capacitor in one phase and discharge into the output in a second phase at a rate set by the clock from the VCO 205. The reference voltage Vref may be any number of well known references such as a bandgap reference voltage generator, for example. In other embodiments, voltage $V_L$ may be sampled, amplified, or divided as necessary. Additionally, the reference voltage may be altered to conform to power supply requirements such as load voltage $V_L$ value.

Battery 202 may provide power to the comparator and may also provide power to other components such as the switch state machine 204 and VCO 205, for example. In one embodiment, battery 202 may be recharged using a battery charging circuit (not shown) that receives power in the same way as load 105. In another embodiment, the control circuit 102 may be powered off of a steady state circuit similar to the one powering the load, except scaled to the power and voltage requirements of the control circuit 102. In this case, a pre-charge circuit may be required when power supply circuit 200 is first started or powered-on. This pre-charge circuit may be a voltage divider network that powers control circuit 102 from charge port 106 or capacitor 103 until the steady state circuit may provide power.

Power supply circuit 200 operates by transferring charge from capacitor 103 to the output, including capacitor 104 and load 105. The transferring of charge may include a charge phase in which charge on capacitor 103 is transferred to charge switched capacitor network 101. Additionally the transferring of charge may include a phase in which charge within switch capacitor network 101 is transferred to capacitor 104.

Figure 3:
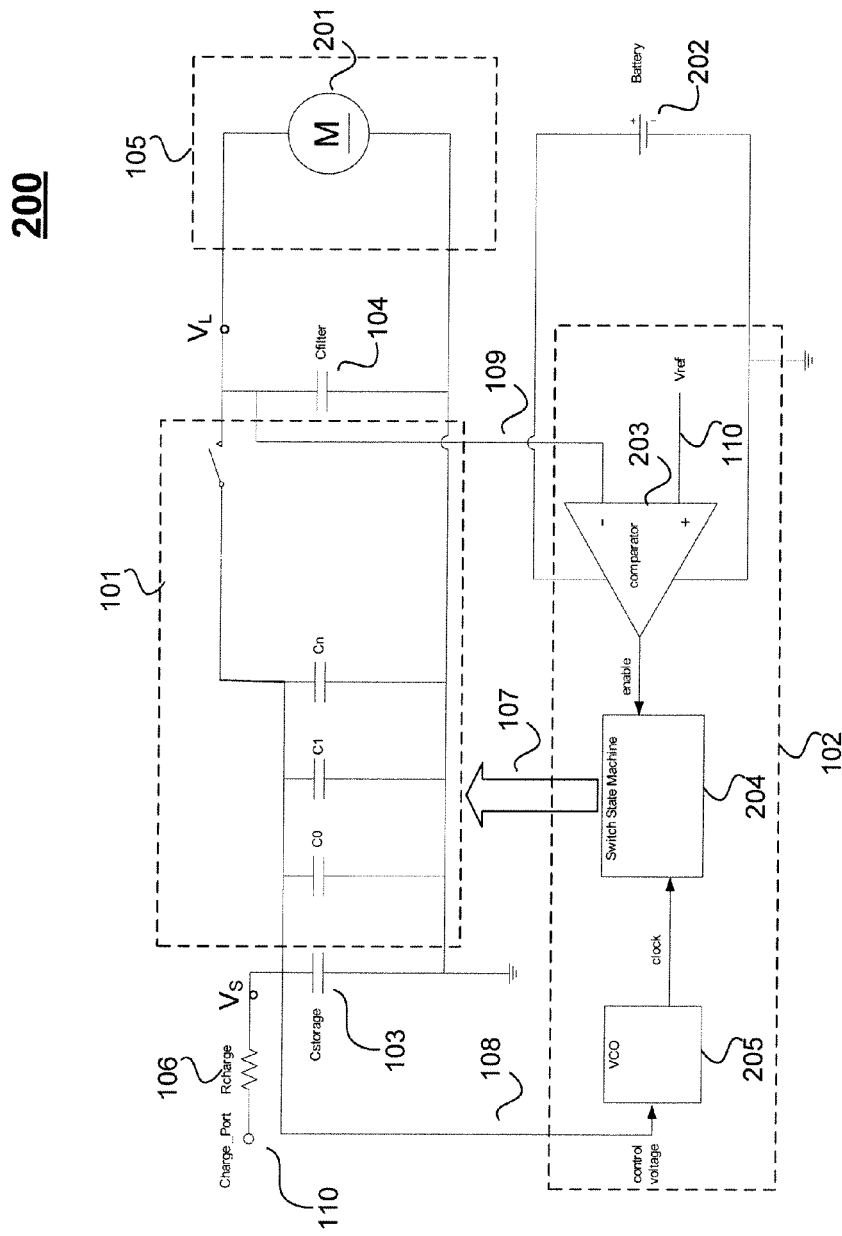
FIG. 3 illustrates the power supply circuit of FIG. 2 in a charge refresh state according to one embodiment of the present invention.

FIG. 3 illustrates the power supply circuit of FIG. 2 in a charge phase according to one embodiment of the present invention. FIG. 3 shows the case where capacitors C0-Cn are being refreshed by capacitor 103. Control circuit 101 has closed switches S0, S1, S3, and Sm and opened switches S2, Sn, and load switch 206 to configure the switched capacitors in parallel with the storage capacitor 103. Capacitors C0-Cn may charge to approximately voltage $V_L$. Capacitors C0-Cn may remove charge from capacitor 103 until capacitors C0-Cn and Capacitor 103 have the same voltage across them. As mentioned above, capacitor 103 may be much larger than capacitors C0-Cn so the drop in voltage may be small. Load 105 (e.g., motor 201) may continue to pull charge off of capacitor 104 while capacitors C0-Cn are charging. Capacitor 104 may be sized large enough support load currents so that the voltage drop at the output is negligible while the switched capacitors are charging.

In some embodiments, it may also be necessary to place a switch between capacitor 104 and the load so that, at the start of operation, capacitor 104 can be charged to an initial state. Once capacitor 104 reaches an operating voltage the load may be applied.

Figure 4:
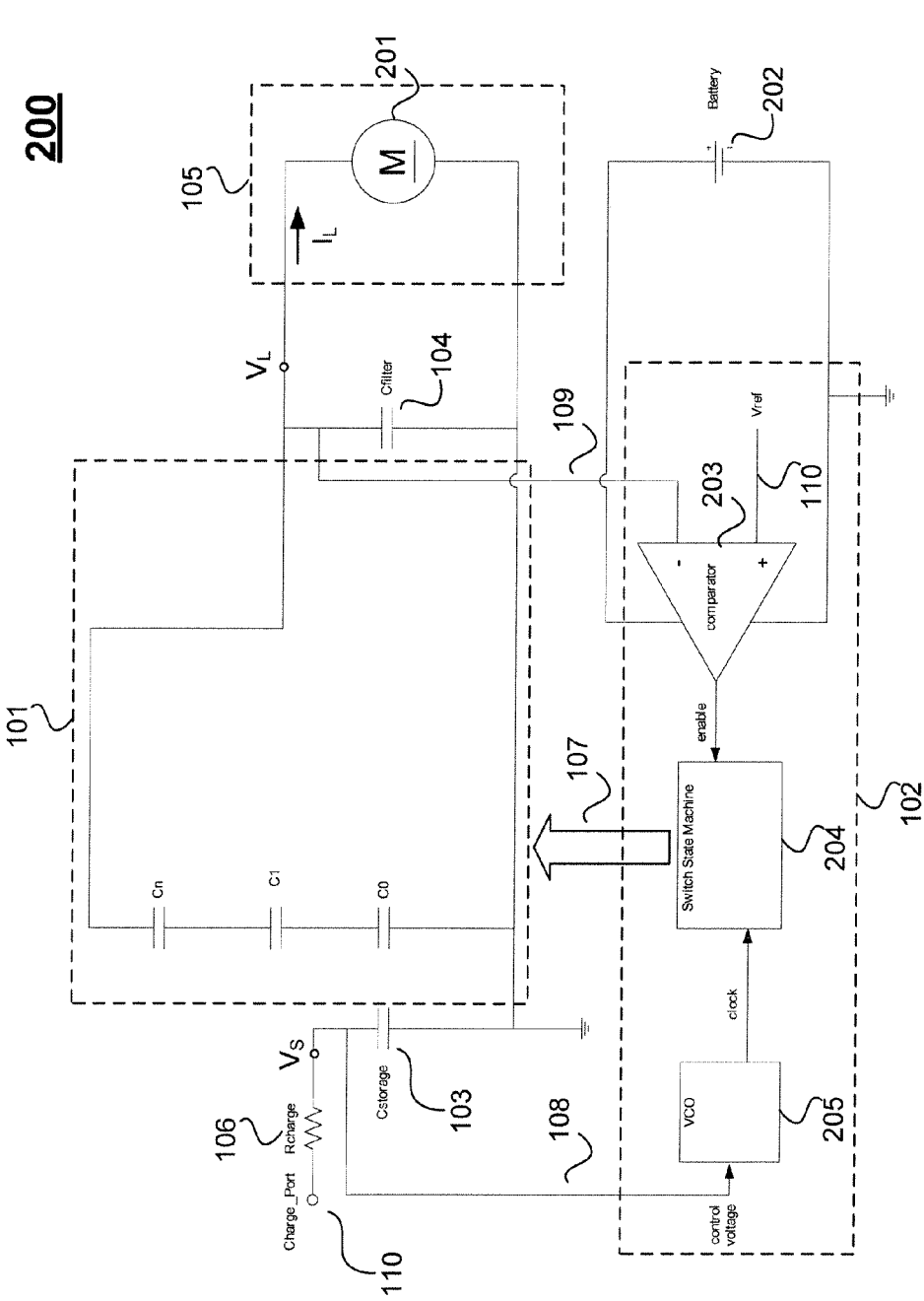
FIG. 4 illustrates the power supply circuit of FIG. 2 in a charge delivery state according to one embodiment of the present invention.

FIG. 4 illustrates the power supply circuit of FIG. 2 in a charge delivery phase according to one embodiment of the present invention. FIG. 4 shows the case where charge is being applied to capacitor 104. Capacitors C0-Cn are configured in series, and the combined voltage delivered to the output may be above the operating voltage of capacitor 104. Since capacitors C0-Cn are much smaller than capacitor 104, the voltage $V_L$ on capacitor 104 may only be perturbed slightly upward as charge is transferred. While the present example illustrates an application where the load voltage is greater than the storage voltage, a variety of switched capacitor configurations may be used to support different load voltages.

A first input 109 of comparator 203 is coupled to a terminal of capacitor 104 to sense the output node voltage $V_L$. A second input 110 of comparator 203 is coupled to a reference voltage. As long as the voltage on capacitor 104 is above the reference Vref, comparator 203 produces a low voltage on its output terminal (e.g., a logic zero). In this example, the low voltage causes switch state machine 204 to be disabled, and power supply circuit 200 may cease transferring charge to the output. Once the voltage on capacitor 104 drops below the reference voltage (e.g., as the load draws current from capacitor 104), comparator 203 transition to a high voltage on the output terminal (e.g., a logic high), which may enable switch state machine 204 to begin switching the capacitors between the phases shown in FIG. 3 and FIG. 4 until the voltage on capacitor 104 rises above the reference.

While the switches in switched capacitor network 101 are switching to maintain voltage $V_L$ at a designated level, capacitor 103 is discharging its voltage $V_S$ is decreasing. As mentioned above, VCO 205 may sense the voltage $V_S$ on capacitor 103 to increase the switching frequency as the voltage on capacitor 103 decreases. Increasing the switching frequency may allow the system to extract as much energy as possible from capacitor 103 while ensuring an approximately constant flow of charge to the output to maintain a reduced level of voltage ripple on capacitor 104. The frequency of VCO 205 may adjust the switching rate inversely proportional to the voltage $V_S$.

As an example, when capacitor 103 is initially charged it may be at 3V. In this example, $V_L$=12V, and the power supply circuit 200 may be designed to extract charge off of capacitor 103 down to a voltage $V_S$=0.5V. This represents pulling 97% of the energy off of capacitor 103. In this example, at least 25 capacitors C0-Cn may be used, and power supply circuit 200 of FIG. 3 would show 25 capacitors in parallel (i.e., n=24) being charged from capacitor 103. Additionally, power supply circuit 200 of FIG. 4 would show 25 capacitors in series charging capacitor 104. The number of capacitors used in an application may depend on one or more of the following factors: load voltage, supply voltage, percent of stored supply energy to be extracted, and the maximum switching speed, for example. Capacitors C0-C24 and capacitor 104 may be sized such that when capacitor 103 is at 3V (and the series combination of capacitors C0-C24 may be at 75V), capacitor 104 may not be severely perturbed. In one embodiment, the number of capacitors used to transfer charge is adjusted dynamically based on the voltage on capacitor 103. For example, by closely monitoring Vs, the number of capacitors used may be changed so that the system would only stack as many switched capacitors as needed to charge the output. In the example above, when Vs=3V, the system may use 5 capacitors to create a series stack of 5 capacitors to boost up the input voltage up to 15V to be able to transfer charge onto the 12V load capacitor 104. As Vs drops more capacitors may be used so that the stacked series of capacitors is above the output voltage. For example, at around 2.4V on Vs the system may use 6 switching capacitors in a series connected stack. At around 2V on Vs, the system may use 7 switching capacitors, etc.

For other applications the capacitor values may be scaled lower. For example, if capacitors C0-C24 were each 1 pF, and capacitor 104 were 100 pF, then the voltage on capacitor 104 would be perturbed about +3 mV every time the series stack was switched in parallel to capacitor 104, as shown in FIG. 4. For a load current $I_L$=1 pA, if the 100 pF capacitor 104 is lifted 3 mV, then the following charge has been transferred:

$$3\ mV * 100\ pF = 0.3\ pC.$$

The switching frequency has to put enough charge to account for the 1 pA load. The switching frequency is as follows:

$$F = 1\ \mu C/s / 0.3\ pC/cycle = 3.333\ MHz.$$

In this example, capacitors C0-C24 deliver about 0.3 pC of charge (per cycle) when $V_S$=3V. When $V_S$ is approaching 0.5V, capacitors C0-C24 will have to run faster to meet the current demands. Note that the values of capacitance and other parameters may be scaled depending on the load. A multi hundred ampere load may be supplied by scaling the capacitors (e.g. C0-C24), accordingly. Likewise, the switching speed may be tailored by scaling the capacitors (e.g. C0-C24).

Figure 5:
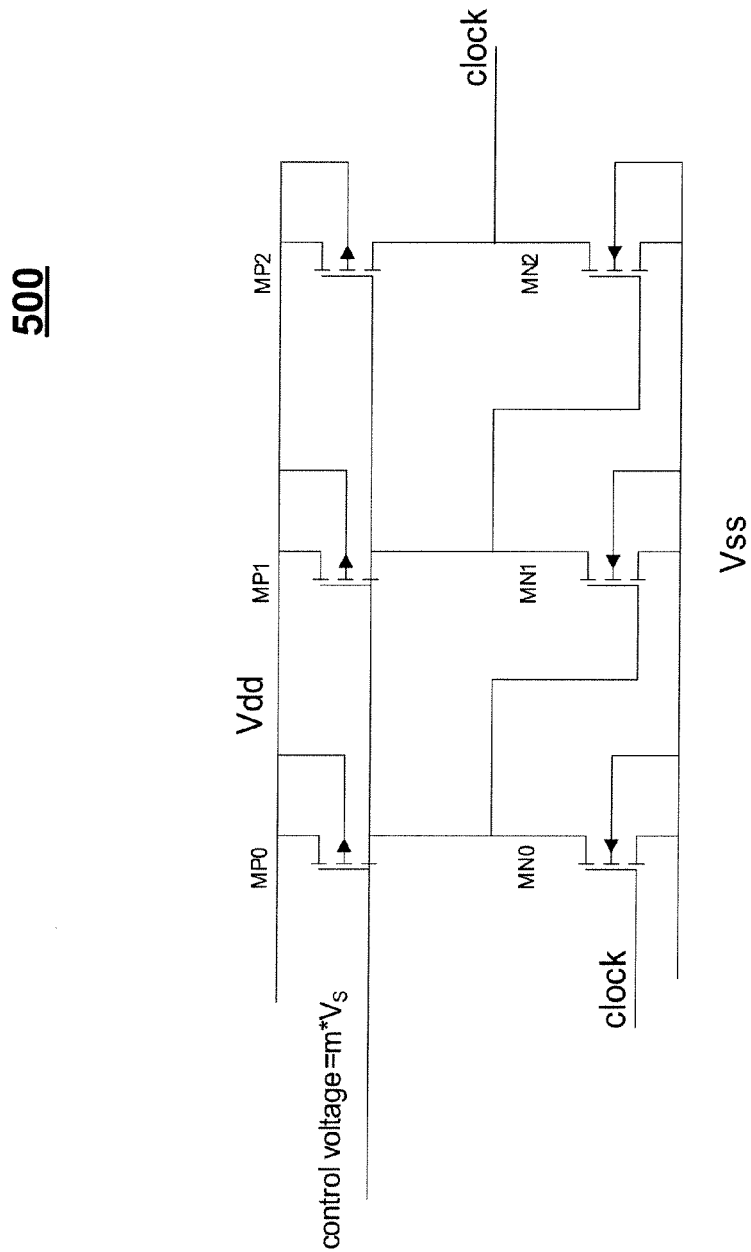
FIG. 5 illustrates an example ring oscillator circuit.

To modify the switching speed automatically, VCO 205 may be used to generate the clock for switch state machine 204. VCO 205 senses the voltage on capacitor 103 and adjusts the frequency of a oscillating signal to switch state machine 204. In one embodiment, a ring oscillator made up of NMOS inverters with PMOS loads may be used as VCO 205 as illustrated in an example below. FIG. 5 illustrates an example ring oscillator circuit. In this example, the gate of each NMOS transistor MN0, MN1, and MN2 are coupled to the drain of a previous NMOS transistor to form a ring. A periodic clock signal may be generated at each drain terminal of each NMOS device. Additionally, the PMOS load transistors MP0, MP1, and MP2 may have gates coupled to capacitor 103, or an amplified/divided representation of the voltage $V_S$, in order that their channel resistances may drop as the voltage $V_S$ on capacitor 103 drops. In this example, a first inverter is made from PMOS MP0 and NMOS MN0. A second inverter is made from MP1 and MN1, and a third inverter includes MP2 and MN1. Here, the PMOS transistors all have the same gate voltage, the control voltage which is a scaled version of the voltage on the storage capacitor. If the VCO is running from a 1.8V supply, and Vs is initially 3V, then the multiplier might be 0.4 to have the control voltage be 1.2V and less (as the storage capacitor discharges). The on strength of the PMOS is proportional to Vdd−m*Vs. The stronger the PMOS the faster the VCO oscillates. As Vs drops, the frequency goes up because the difference Vdd−m*Vs increases. This is just one example of a possible implementation of VCO 205 to implement a clock. A variety of VCO techniques may be implemented such that the VCO increases frequency as the voltage $V_S$ decreases.

VCO 205 may not need to have tightly controlled frequency control. The switch state machine 204 may only operate when the voltage $V_L$ on capacitor 104 decreases past a threshold. Accordingly, if VCO 205 is designed to switch at a frequency (fo) that is sufficiently above a minimum frequency to maintain a minimum charge transfer rate, then voltage $V_L$ may be maintained on capacitor 104.

In one embodiment, VCO 205 may be enabled/disabled with a similar, or time shifted version, of the signal used to enable switch state machine 205. Turning the VCO 205 off when not needed may save power.

Example

Electric Motorcycle

In this example, the design of a system for use in an electric motorcycle is explained. First, the peak current is determined Let M=mass of rider, gear, and motorcycle and M=300 kg. Assume top acceleration rate is 0 to 60 MPH in 5 seconds, a 48V motor, and a storage capacitor 103 that is able to run the motorcycle for 1 hour at a continuous power of 3 HP with initial charge of 120V. The following parameters may be calculated:

Acceleration rate in m/s=60 MPH/5 s=88 ft/s/5 s=17.6 ft/s$^2$=5.37 m/s$^2$

Acceleration Force=mass*acceleration=300 kg*5.37 m/s$^2$=1610 N

Work in accelerating to 60 MPH in 5 s may be determined as follows:

Work=Force*distance=1610 N*½a*t$^2$=1610 N*½*5.37 m/s$^2$*(5 s)$^2$=108000 N*=108 kJ Power=Work/time=108 kJ/5 s=20,400 Watts Using a 48V motor the system must be able to deliver a current as follows:

20,400 Watts/48V=425 A

Given the above peak current, the storage capacity of capacitor 103 may be determined. Assume the motorcycle can run for 1 hour at a continuous power of 3 HP (e.g., small bike cruising at about 40 MPH). This gives a 40 mile range. 1 HP=746 Watts, so 3 HP=2238 Watts. At 48 V the current drawn is WN=2238 W/48V=46.6 A. 1 hour=3600 seconds. 3600 seconds*46.6 A=3600 s*46.6 C/s=167.8 kC of charge. Assuming 120V charging voltage the capacitor must be at least:

$C_{103}$=167.8 kC/120V=1400 F

It may be assumed that assumed that the system may only draw 90% of the charge off the capacitor. Accordingly, the capacitance may be increased as follows:

$C_{103}$=1400 F/0.9=1560 F

Next, the number of switched capacitors (e.g., $C_0$,$C_1$, etc.) required to be stacked in series may be determined. Assuming an initial charge voltage=120V, the final voltage if 90% of the energy is used may be determined.

$E_i$½=*$C_{103}$*$V_i^2$ initial energy stored on capacitor.

$E_f$=½*$C_{103}$*$V_f^2$ final energy stored on capacitor=0.1*$E_i$.

Rewriting the two equations:

$E_f$=0.1*$E_i$ and $V_f^2$=0.1*$V_i^2$.

Taking the square root of both sides of the equation:

$V_f$=0.316*$V_i$.

Substituting 120V for $V_i$ results in the following:

$V_f$=37.9V.

$V_f$ is the final voltage after discharging, and represents how far the system will discharge $C_{103}$ while running the motor. Note the system can actually discharge to slightly more than 24V and the system will keep working. Given that the system will power a 48V motor, two capacitors in series are sufficient as follows:

2*37.9V=75.8V>48 V.

Next, the ripple on the filter capacitor 104 may be determined. The design may be for 1V ripple, which is an arbitrary level. Assume minimum switch frequency of 1 kHz (1000 cycles/s). Given maximum current of 425 A (see 0-60 MPH acceleration), which is 425 C/s (coulombs/s), each clock cycle must transfer 425 C/s/1000 cycles/s=0.425 C/cycle. C=Q/V (capacitance equals charge per voltage)=0.425C/1V=0.425 F. Accordingly, a filter capacitor of 0.425F is needed to meet the 1V ripple requirement with a 1 kHz clock delivering the maximum current for the desired vehicle acceleration. For this design example, a 1F filter capacitor 104 is selected as an arbitrary choice to give some margin and make future calculations easier.

Next, the switched capacitors $C_0$ and $C_1$ may be determined. For this illustrative example, it is assumed the system has been running for a period of time and there is 48V on capacitor 104, and the storage capacitor 103 has discharged to about 100V. For this example, assume $C_0$=$C_1$. Assuming maximum acceleration and lowest clock frequency the system must transfer 0.425C of charge onto capacitor 104. When the switching capacitors $C_0$ and $C_1$ are configured in series and coupled to the output, the sum of charge in the system is:

ΣQ=$Q_P$+48C.

The 48C is the charge on capacitor 104 immediately before we transfer charge. The total capacitance in the system is:

ΣC=0.5*$C_0$+1F.

The 1 Farad is capacitor 104. The voltage across capacitor 104 is the same voltage as appears across the series connection of $C_0$ and $C_1$ and is 48.425 V. The voltage has to be proportional to the charge and capacitance (i.e., V=Q/C), which using the total charge and total capacitance from the equations above gives:

$$48.425\,V = \frac{Q_P + 48\,C}{0.5 * C_0 + 1F}.$$

But $Q_P$=100V*$C_0$ which gives:

$$48.425\,V = \frac{100\,V * C_0 + 48\,C}{0.5 * C_0 + 1F}.$$

The switching capacitance value, $C_0$, is the only unknown in the above equation, which results in:

$C_0$=$C_1$=5.6 mF.

Again for a slightly larger capacitor of 6 mF may be selected for tolerance concerns.

Next, the maximum switch frequency at 10% energy remaining may be determined. At 10% energy, the voltage across 103 is 37.9V. The charge, $Q_P$ will then be $Q_P$=C*V=6 mF*37.9V=0.2274 C. From the above design parameters, the voltage when the capacitors are in series is:

$$V = \frac{Q_P + 48\,C}{0.5 * C_0 1\,F}.$$

Plugging in $Q_P$:

$$V = \frac{0.2274\,C + 48\,C}{0.5 * 6\,mF + 1\,F} = 48.08315\,V$$

The voltage on capacitor 104 has been raised by 0.08315V, which, given a value of 1F, translates into 0.08315C. Accordingly, when the system is nearly out of energy we are only transferring 0.08315C per transfer cycle. Since the maximum current is 425 A, which is 425 C/s for maximum vehicle acceleration, the clock must switch at:

$$F_{max}=425\ C/s/0.08315C=5.111\ kHz.$$

The following table illustrates the parameters for the above example design. Using these parameters it will take approximately 100 ms to initially pump up the filter capacitor 104 to 48V to start operating the vehicle.

| Feature/Component | Design Value |
|---|---|
| Minimum switch frequency | 1 kHz |
| Maximum switch frequency | 5.111 kHz |
| Maximum storage voltage | 120 V |
| Motor Voltage | 48 V |
| $C_{filter}$ (104) | 1 F |
| $C_{storage}$ (103) | 1560 F |
| $C_0$, $C_1$ (part of 107) | 6 mF |
| Gross Vehicle Mass | 300 kg |
| Vehicle Range | 40 miles (65 km) |
| Maximum Acceleration | 5.37 m/s² |

Figure 6:
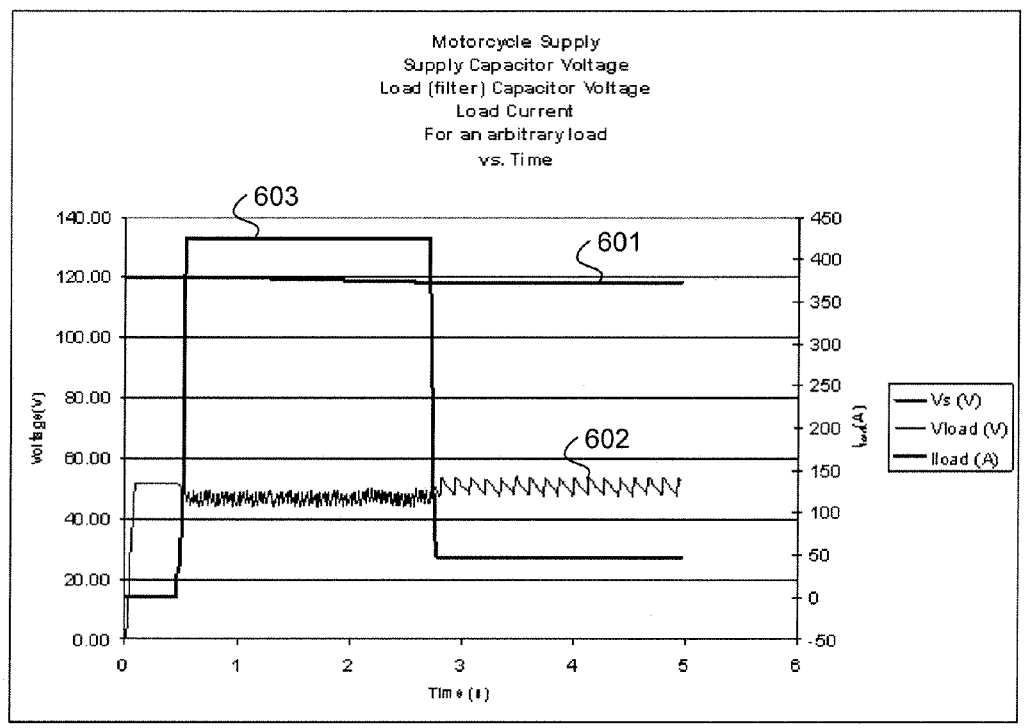
FIG. 6 shows the behavior of a system using the example design parameters described above.

FIG. 6 shows the behavior of a system using the example design parameters described above. The orange line is an arbitrary load line. Plot 601 shows the voltage on capacitor 103, Vs, plot 602 shows the voltage on capacitor 104, and plot 603 shows the load current. In this example, the motorcycle is sitting idle for about ½ second. During this idle time the system powers up the load capacitor 104. The plot illustrates that it takes about 100 ms to charge up capacitor 104. At about ½ second the motorcycle is rapidly accelerated to a maximum load current, where it is drawing 425 A. The load capacitor line begins receiving transfers of charge. There is also a drop in voltage on the supply capacitor 103. The motorcycle continues accelerating until about 2.8 s where it drops down to about 50 A for cruising, and the activity on the load capacitor decreases. For this simulation, a time step of 10 ms was chosen, which is why the ripple is so large on Vload. Many cycles of charge pumping are being summed for each data point on the chart.

Figure 7:
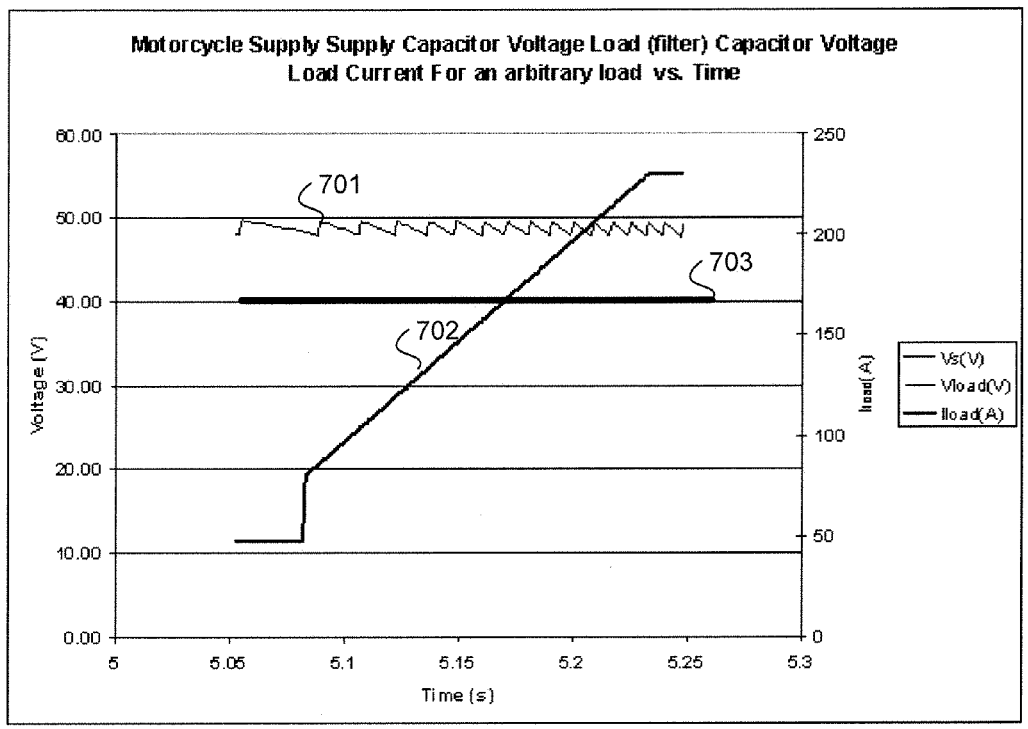
FIG. 7 shows the output voltage, load current, and storage capacitor voltage for a later period of system operation.

FIG. 7 shows the output voltage 701, load current 702, and storage capacitor voltage 703 for a later period of system operation. Capacitor 103 has been discharged to near empty, and now only has 40V across it as shown at 703. The motor current starts at a cruise level and is slowly ramped to about 225 A. The charge transfer rate on Vload increases. In this simulation, many cycles are being lumped together so Vload is rippling more than it will in an actual system. Even with the summing of many cycles the ripple is within the 1V design constraint.

Figure 8:
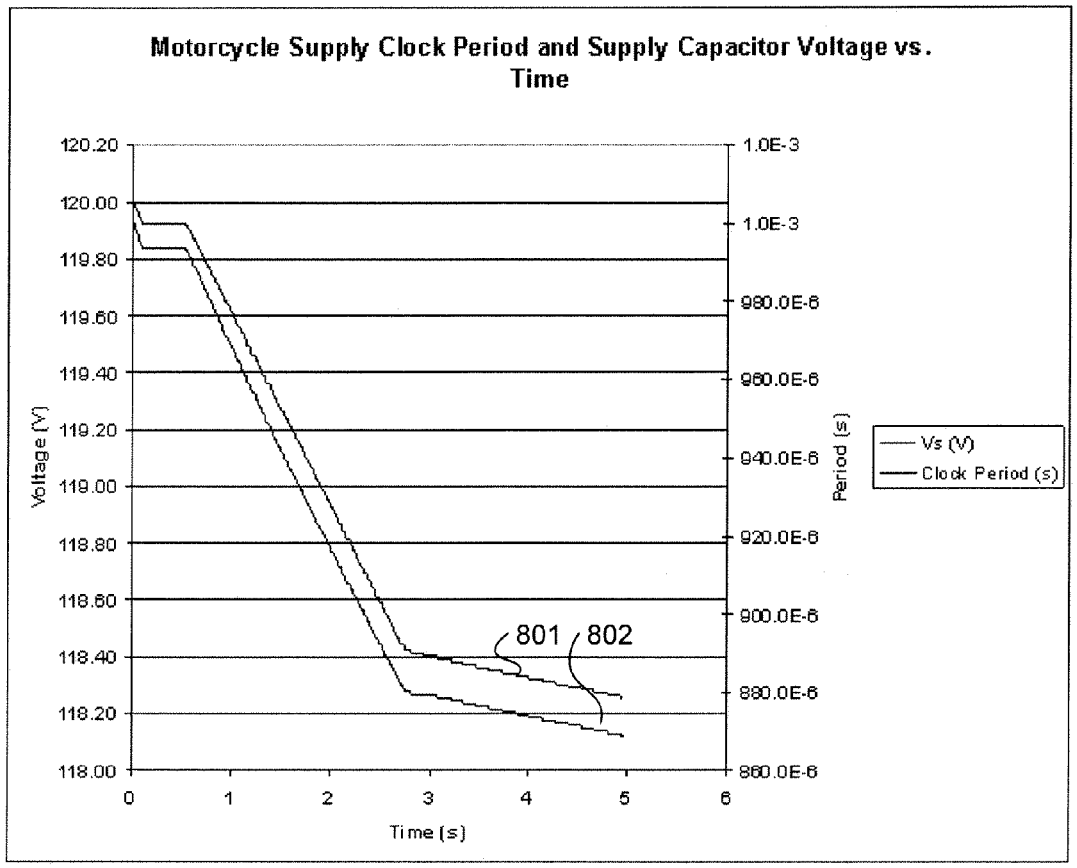
FIG. 8 shows a detailed look at the supply capacitor voltage versus time and the VCO clock period versus time.

FIG. 8 shows a detailed look at the supply capacitor 103 voltage versus time and the VCO clock period versus time. The plots illustrate that the VCO clock period 802 changes in proportion to the voltage 801 on capacitor 103.

Example

Handheld Appliance

In this example, the parameters for a handheld appliance are determined. First, the peak current is determined Assume 4 watts peak on 1.1V supply voltage. The peak current is:

$$I\text{max}=4\ W/1.1V=3.636\ A$$

Next, the storage capacity may be determined. Assume the appliance runs on 100 μA for 48 hours of standby.

1 hour=3600 seconds.

3600 seconds/hr*48 hours*100 μA=17.3C of charge.

Assuming 4V charging voltage the capacitor must be at least:

$$C_{103}=17.3C/4V=4.32\ F$$

Assume 90% extraction as above, the final value of capacitance is:

$$C_{103}=4.32F/0.9=4.8\ F$$

Next, the number of switching capacitors may be determined. For an initial charge voltage of 4V, the final voltage if 95% of the energy is used may be found. Note the capacitor is oversized, but the calculation is assuming we will get almost all the energy out.

$$E_i=\tfrac{1}{2}*C_{103}*V_i^2\ \text{initial energy stored on capacitor.}$$

$$E_f=\tfrac{1}{2}*C_{103}*V_f^2\ \text{final energy stored on capacitor}=0.05*E_i.$$

Rewriting the two equations:

$$E_f=0.1*E_i\ \text{and}\ V_f^2=0.05*V_i^2.$$

Taking the square root of both sides of the equation:

$$V_f=0.224*V_i$$

Substituting 4V for $V_i$:

$$V_f=0.894V.$$

The result is how far the system will discharge $C_{103}$ while running the appliance. Given a design specification to power a 1V appliance, the system may to stack two capacitors to have enough voltage to power the motor as follows:

$$2*0.894V=1.788V>1\ V.$$

Next, the parameters relating to maximum ripple on filter capacitor 104 ($C_{104}$) may be determined. The design specification may set the ripple at 10 mV. Assume a minimum switch frequency of 100 MHz. Given maximum current of 3.63 A, which is 3.63C/s, each clock cycle may transfer 3.63C/s/100 M cycles/s=36.3 nC/cycle. Since C=Q/V (capacitance equals charge per voltage)=36.3 nC/10 mV=3.63 μF in this example, a filter capacitor 104 of 4 μF may be used to meet the 10 mV ripple requirement with a 100 MHz clock delivering the maximum current.

Next, switch capacitors $C_0$ and $C_1$ may be calculated. The same equations and discussion apply as for the motorcycle example above may be used. Simply change the values in the equations.

$$1.1\ V+39.93\ nV=\frac{Q_P+4.4\ \mu C}{0.5*C_0+4\ \mu F}$$

The 39.93 nV is how much the voltage may increase due to the charge transferred onto the filter capacitor 104. In this example, $Q_P=4V*C_0$, which gives:

$$1.1\ V+39.93\ nV=\frac{4\ V*C_0+4.4\ \mu C}{0.5*C_0+4\ \mu F}.$$

The value for $C_0$ follows:

$$C_0=C_1=47\ nF.$$

Again for tolerance, a slightly larger capacitor may be used, 60 nF.

Next, the maximum switch frequency at 1.6% energy remaining may be determined. At 5% energy, the voltage across capacitor 103 is 0.894V. For this example, it is assumed that the lowest operating voltage for the load is 1V. The charge $Q_P$ will then be $Q_P=C*V=60$ nF*0.894V=53.7 nC. From the equations above, the voltage on capacitor 104 is:

$$V = \frac{Q_P + 4 \; \mu C}{0.5 * C_0 + 4 \; \mu F}.$$

Substituting in $Q_P$:

$$V = \frac{53.7 \; nC + 4 \; \mu C}{0.5 * 60 \; nF + 4 \; \mu F} = 1.00588 \; V.$$

Accordingly, the voltage on capacitor 104 has been raised by 5.88 mV (assuming a minimum allowed voltage of 1V) and 23.5 nC have been transferred for C104=4 µF. Therefore, when the system is nearly out of energy only 23.5 nC are transferred per transfer cycle. Since the maximum current requirement is 3.63 A (or 3.63 C/s), the clock must switch at the following frequency:

$F_{max}$=3.63 C/s/23.5 nC=154 MHz.

Figure 9:
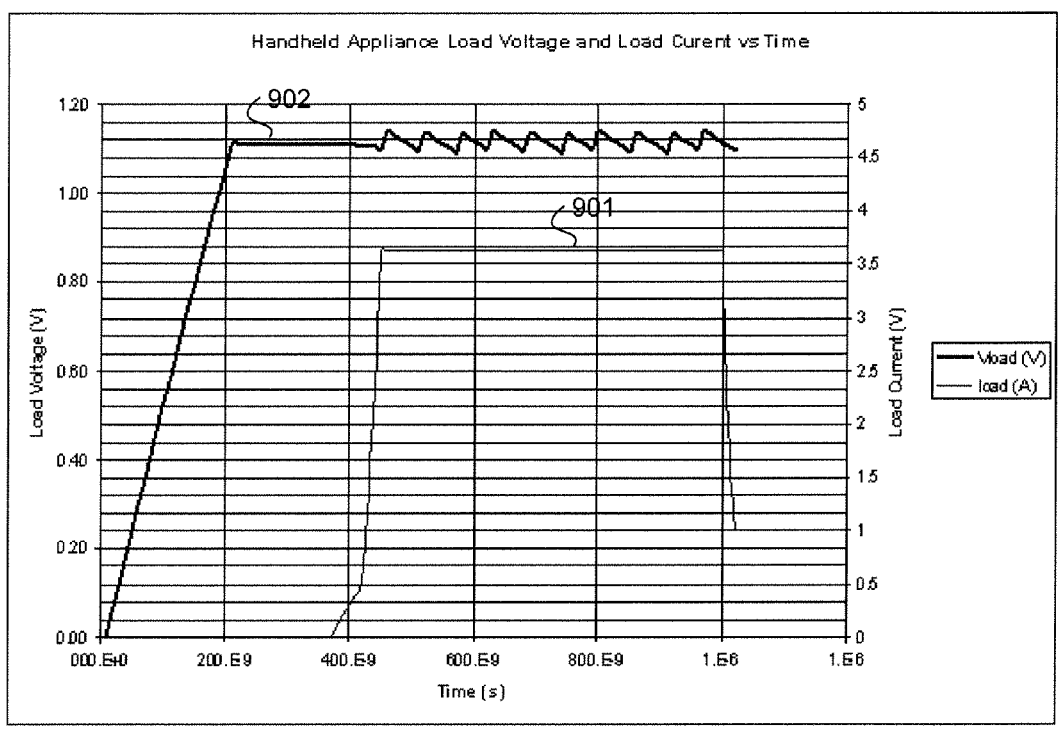
FIG. 9 shows the load capacitor the load current and the output voltage versus time for the handheld appliance example.

FIG. 9 shows the load capacitor (104) the load current 901 and the output voltage 902 versus time for the handheld appliance example. The load current starts at 0 while the load capacitor charges. At about 200 ns the load capacitor is fully charged. At about 400 ns the load is ramped to 3.63 A. The circuit starts regulating as can be seen by the ripple on the load voltage. As in the example above, the clock period decreases proportional to the supply voltage.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A circuit comprising:
   a first capacitor having a terminal for connection to a power source that is external to the circuit, wherein the first capacitor stores a charge from the power source when the terminal of first capacitor is connected to the power source;
   a second capacitor having a terminal for connection to an electronic device to provide power to the electronic device;
   a plurality of switched capacitors configured to transfer a charge stored by the first capacitor to the second capacitor, wherein the charge transferred to the second capacitor from the first capacitor serves as the power provided to the electronic device via the terminal of the second capacitor; and
   a control circuit configured to control switching of the plurality of switched capacitors based on a voltage of the second capacitor,
   wherein the plurality of switched capacitors are switched at a frequency that is inversely proportional to a voltage of the first capacitor.

2. The circuit of claim 1, wherein the plurality of switched capacitors comprise a plurality of capacitors and a plurality of switches, wherein in a first configuration a first portion of the plurality of switches is closed to arrange the plurality of capacitors in parallel, and wherein in a second configuration a second portion of the plurality of switches is closed to arrange the plurality of capacitors in series, wherein each switched capacitor of the plurality of switched capacitors is coupled to the first capacitor to receive a charge from the first capacitor in the first configuration, and wherein each switched capacitor of the plurality of switched capacitors is coupled to the second capacitor to deliver the charge received by the switched capacitor to the second capacitor in the second configuration.

3. The circuit of claim 1, wherein the plurality of switched capacitors comprise:
   a first switching capacitor having a first terminal coupled to a reference voltage and a second terminal coupled to the first capacitor via a first switch; and
   one or more additional switching capacitors each having a first terminal coupled to a first terminal of a preceding capacitor via a second switch and a second terminal coupled to the first terminal of the preceding capacitor via a third switch and further coupled to the reference voltage via a fourth switch,
   wherein a terminal of a last capacitor of the one or more additional capacitors is coupled to the second capacitor via a fifth switch.

4. The circuit of claim 1, further comprising:
   a comparator configured to receive the voltage of the second capacitor as a first input and a reference voltage as a second input, and initiate switching of the plurality of switched capacitors based on the voltage of the second capacitor,
   wherein the plurality of switched capacitors transfer charge from the first capacitor to the second capacitor when the voltage of the second capacitor is determined to be below the reference voltage by a predetermined amount.

5. The circuit of claim 1, wherein the control circuit comprises a voltage-controlled oscillator that is coupled to the first capacitor to receive the voltage of the first capacitor as an input, wherein the voltage-controlled oscillator is configured to output an oscillating signal, wherein the switching of the plurality of switched capacitors is responsive to the oscillating signal, and wherein a frequency of the oscillating signal increases as the voltage on the first capacitor decreases.

6. The circuit of claim 1, wherein the electronic device has a designated operating current, and wherein a maximum frequency of the switching of the plurality of switched capacitors produces a current at a node coupling the second capacitor and the electronic device, such that the produced current is greater than or equal to the designated operating current of the electronic device.

7. An electronic system comprising:
   electronic circuitry; and
   a capacitive power supply having
      a first capacitor Configured for connection to a power source that is external to the capacitive power supply, wherein the first capacitor is configured to store a charge from the power source when the first capacitor is connected to the power source;
      a second capacitor coupled to the electronic circuitry for providing power to the electronic circuitry;

a plurality of switched capacitors configured to transfer the charge stored at the first capacitor to the second capacitor, wherein the charged transferred to the second capacitor from the first capacitor serves as the power provided to the electronic circuitry; and a control circuit configured to control switching of the plurality of switched capacitors based on a voltage of the second capacitor, wherein the plurality of switched capacitors are switched at an increasing frequency when a voltage of the first capacitor decreases, wherein the voltage of the second capacitor increases as the charge is transferred from the first capacitor to the second capacitor, and wherein the voltage of the first capacitor decreases as the charge is transferred from the first capacitor to the second capacitor.

8. The electronic system of claim 7, wherein the plurality of switched capacitors comprise a plurality of capacitors and a plurality of switches, wherein in a first configuration a first portion of the plurality of switches is closed to arrange the plurality of capacitors in parallel, and wherein in a second configuration a second portion of the plurality of switches is closed to arrange the plurality of capacitors in series, wherein each switched capacitor of the plurality of switched capacitors is coupled to the first capacitor to receive a charge from the first capacitor in the first configuration, and wherein each switched capacitor of the plurality of switched capacitors is coupled to the second capacitor to deliver the charge received by the switched capacitor to the second capacitor in the second configuration.

9. The electronic system of claim 7, wherein the plurality of switched capacitors comprise:

a first switching capacitor having a first terminal and a second terminal, wherein the first terminal of the first switching capacitor is coupled to a reference voltage, and wherein the second terminal of the first switching capacitor is coupled to the first capacitor via a first switch; and one or more additional switching capacitors, each additional switching capacitor having
a first terminal coupled to a first terminal of a preceding capacitor via a second switch, and
a second terminal coupled to (i) the first terminal of the preceding capacitor via a third switch, and (iii) the reference voltage via a fourth switch, wherein a terminal of a last capacitor of the one or more additional capacitors is coupled to the second capacitor via a fifth switch.

10. The electronic system of claim 7, further comprising:
a comparator configured to
receive the voltage of the second capacitor as a first input and a reference voltage as a second input, and
initiate switching of the plurality of switched capacitors based on the voltage of the second capacitor, wherein the plurality of switched capacitors are configured to transfer the charge stored at the first capacitor to the second capacitor when the voltage of the second capacitor is determined to be below the reference voltage by a predetermined amount.

11. The electronic system of claim 7, wherein the control circuit comprises a voltage-controlled oscillator that is coupled to the first capacitor, wherein the voltage-controlled oscillator is configured to i) receive the voltage stored at the first capacitor as an input, ii) output an oscillating signal, wherein the switching of the plurality of switched capacitors is responsive to the oscillating signal output by the voltage-controlled oscillator, and wherein a frequency of the oscillating signal increases as the voltage of the first capacitor decreases.

12. The electronic system of claim 7, wherein the electronic circuitry is a motor.

13. The electronic system of claim 7, wherein the electronic system is an electric vehicle.

14. A method of powering an electronic device, the method comprising:

charging a first capacitor with a charge received from an power source that is external to the electronic device, wherein the first capacitor is charged to achieve a supply voltage;

during a first phase, arranging a plurality of switched capacitors in parallel with the first capacitor, and transferring charge from the first capacitor to the plurality of switched capacitors;

during a second phase, arranging the plurality of switched capacitors in series, wherein one of the plurality of switched capacitors arranged in series is coupled to a second capacitor, and transferring charge from the plurality of switched capacitors arranged in series to the second capacitor; and transferring a charge stored at the second capacitor to the electronic device, wherein the plurality of switched capacitors are switched between the first phase and the second phase based on a voltage of the second capacitor, and wherein a switching frequency of the plurality of switched capacitors increases as the supply voltage of the first capacitor decreases.

15. The method of claim 14, further comprising comparing the voltage of the second capacitor to a reference voltage, wherein the first and second phases are activated when the voltage of the second capacitor is determined to be below the reference voltage by a predetermined amount, and wherein the plurality of switched capacitors are configured to transfer a charge stored at the first capacitor to the second capacitor when the voltage of the second capacitor is determined to be below the reference voltage by the predetermined amount.

16. The method of claim 14, further comprising:
determining the voltage of the first capacitor; and
generating an oscillating signal based on the determined voltage of the first capacitor,
wherein the switching of the plurality of switched capacitors is responsive to the oscillating signal, and wherein a frequency of the oscillating signal increases as the voltage of the first capacitor decreases.

17. The method of claim 14, wherein the first capacitor is coupled to a charge port via a charging circuit.

18. The method of claim 14, wherein the plurality of switched capacitors comprise:

a first switching capacitor having a first terminal and a second terminal, wherein the first terminal of the first switching capacitor is coupled to a reference voltage, and wherein the second terminal of the first switching capacitor is coupled to the first capacitor via a first switch; and one or more additional switching capacitors, each additional switching capacitor having
a first terminal coupled to a first terminal of a preceding capacitor via a second switch, and
a second terminal coupled to i) the first terminal of the preceding capacitor via a third switch, and ii) the reference voltage via a fourth switch, wherein a terminal of a last capacitor of the one or more additional capacitors is coupled to the second capacitor via a fifth switch.

19. The method of claim 14, wherein the electronic device has a designated operating current, and wherein a maximum frequency of the switching of the plurality of switched capacitors produces a current at a node coupling the second capacitor and the electronic device, such that the current produced by the maximum frequency of switching is greater than or equal to the designated operating current of the electronic device.

20. The circuit of claim 1, wherein the frequency of the switching increases as the voltage on the first capacitor decreases.

* * * * *